Jan. 24, 1967 T. BUDZICH 3,300,102
INFLATABLE BAG FLUID DISPENSING DEVICE
Filed March 12, 1965 5 Sheets-Sheet 1
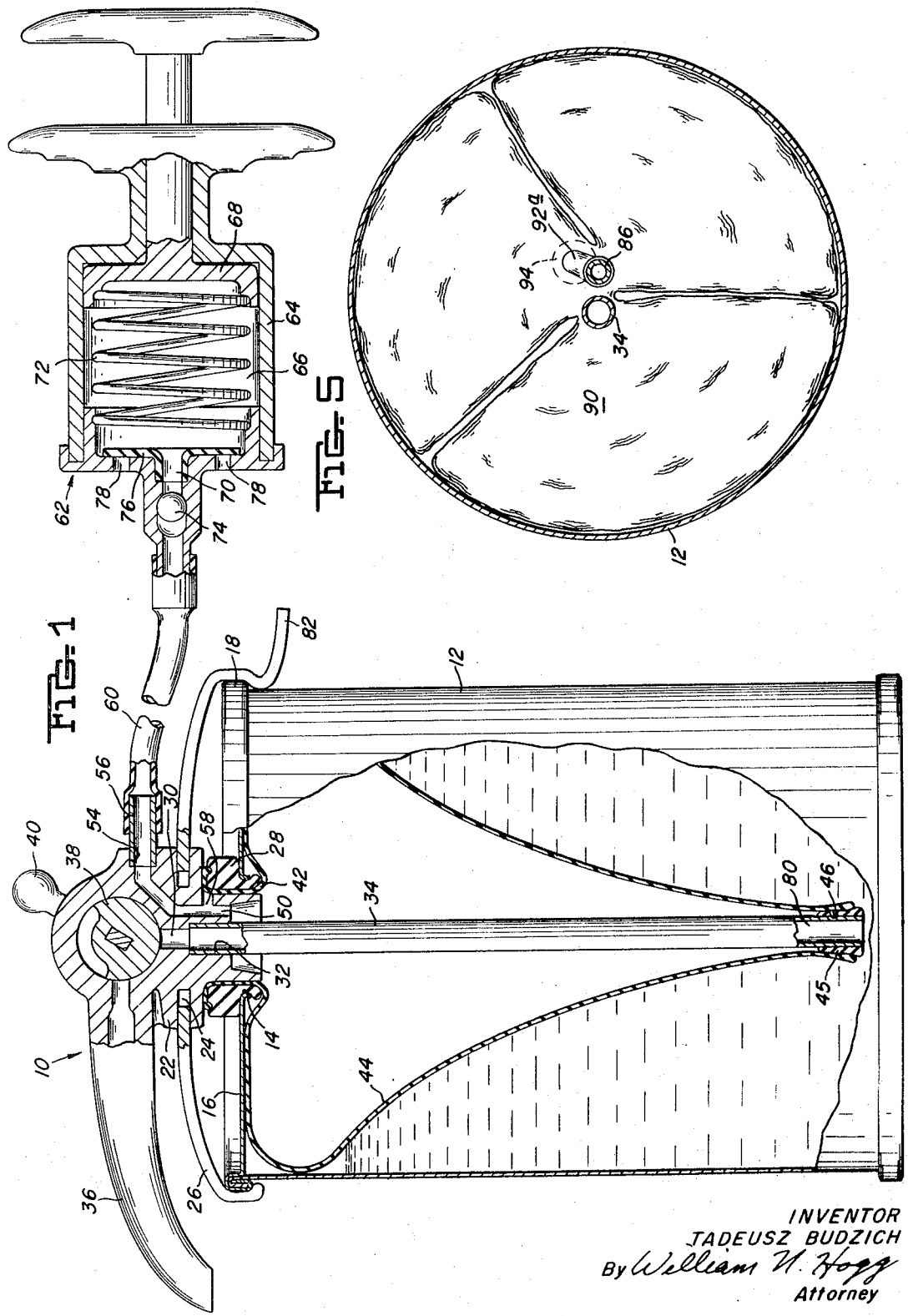
INVENTOR
TADEUSZ BUDZICH
By William N. Hogg
Attorney Jan. 24, 1967 T. BUDZICH 3,300,102
INFLATABLE BAG FLUID DISPENSING DEVICE
Filed March 12, 1965 5 Sheets-Sheet 2
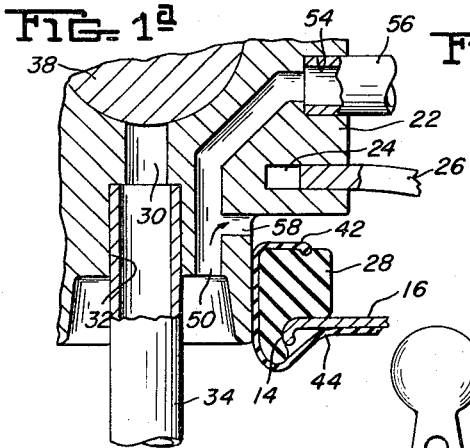
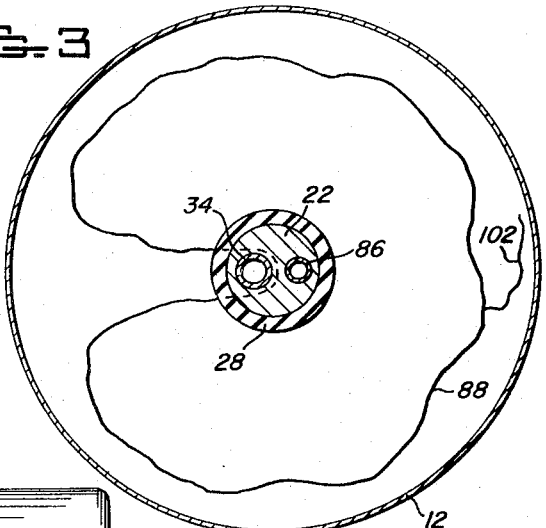
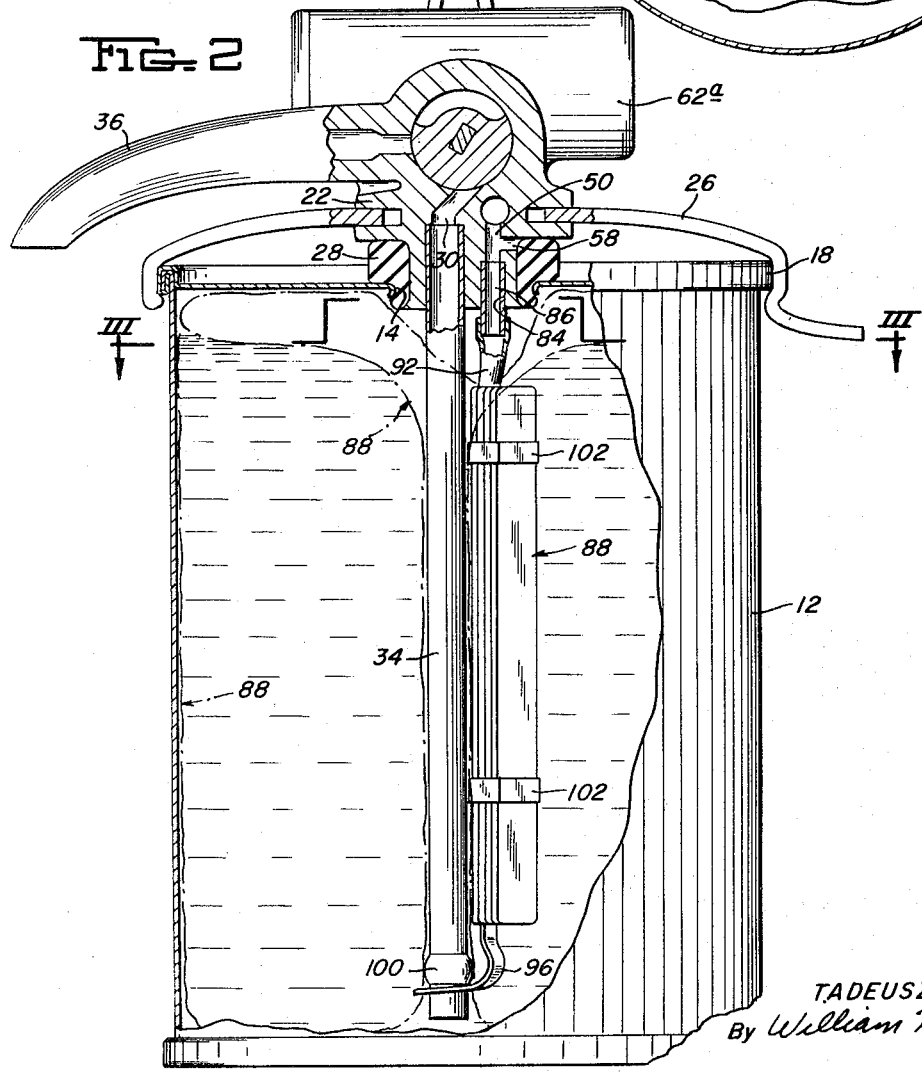
INVENTOR
TADEUSZ BUDZICH
By William H. Hogg
Attorney Jan. 24, 1967 T. BUDZICH 3,300,102
INFLATABLE BAG FLUID DISPENSING DEVICE
Filed March 12, 1965 5 Sheets-Sheet 3
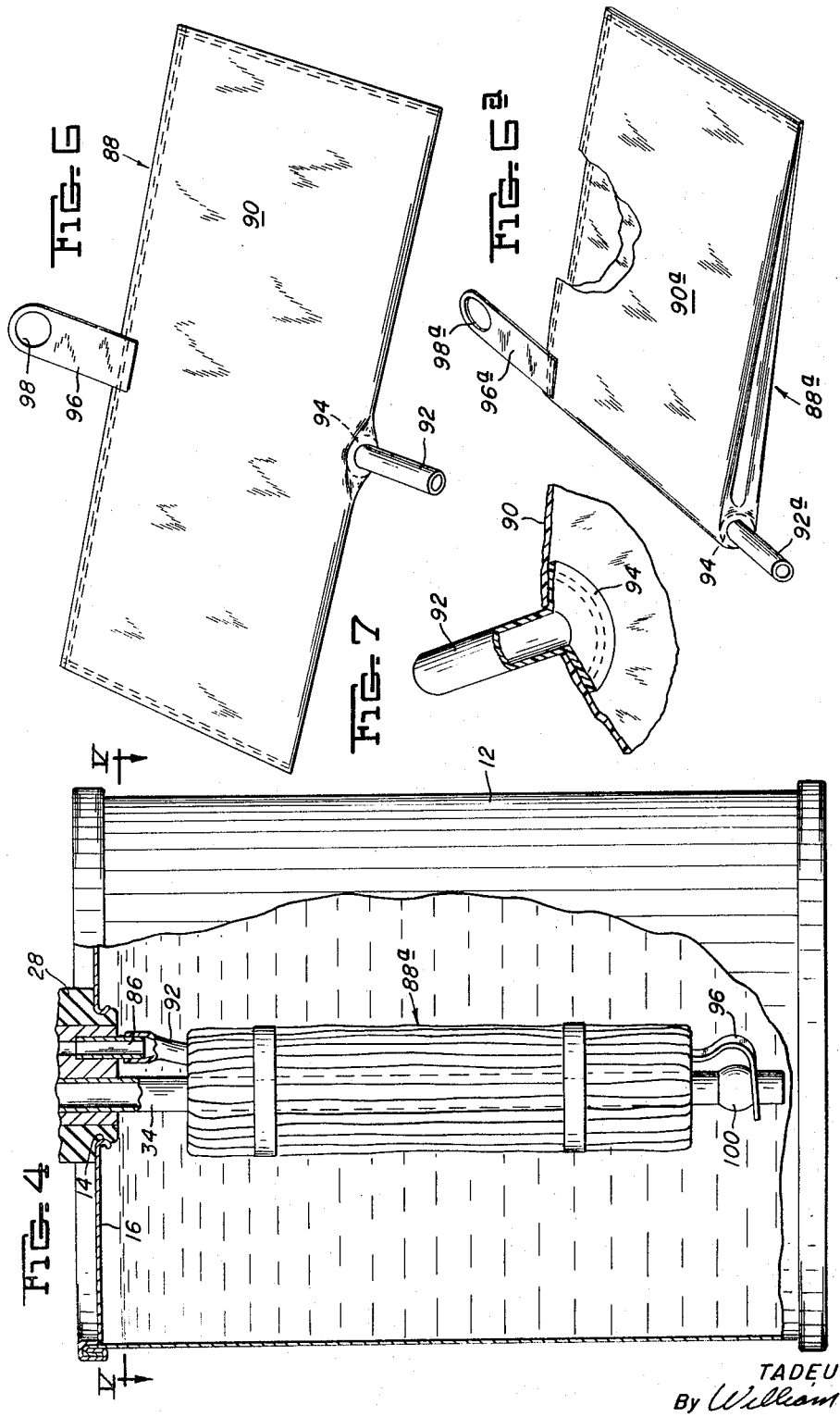
INVENTOR
TADEUSZ BUDZICH
By William H. Hogg
Attorney

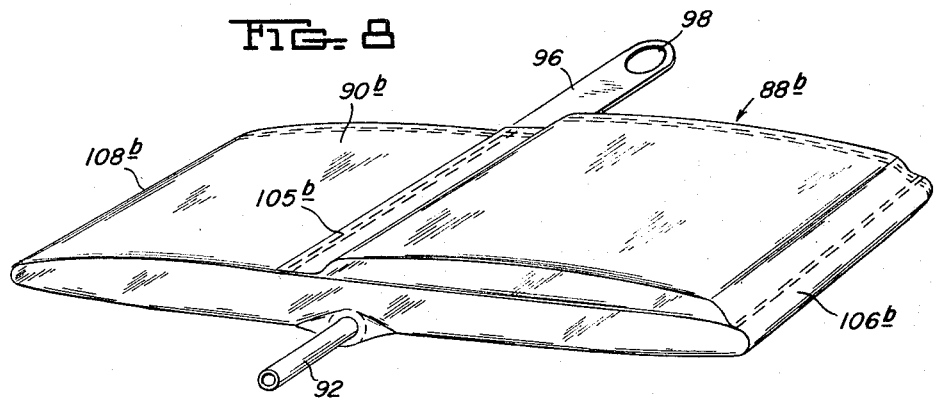
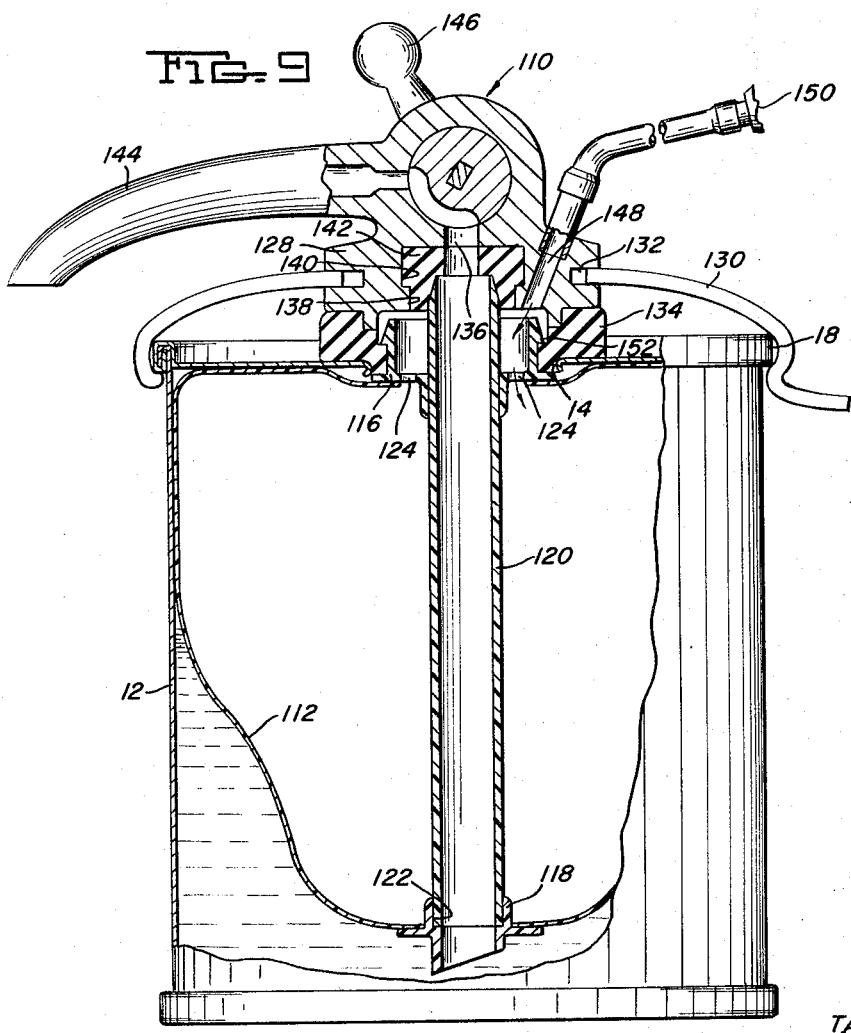

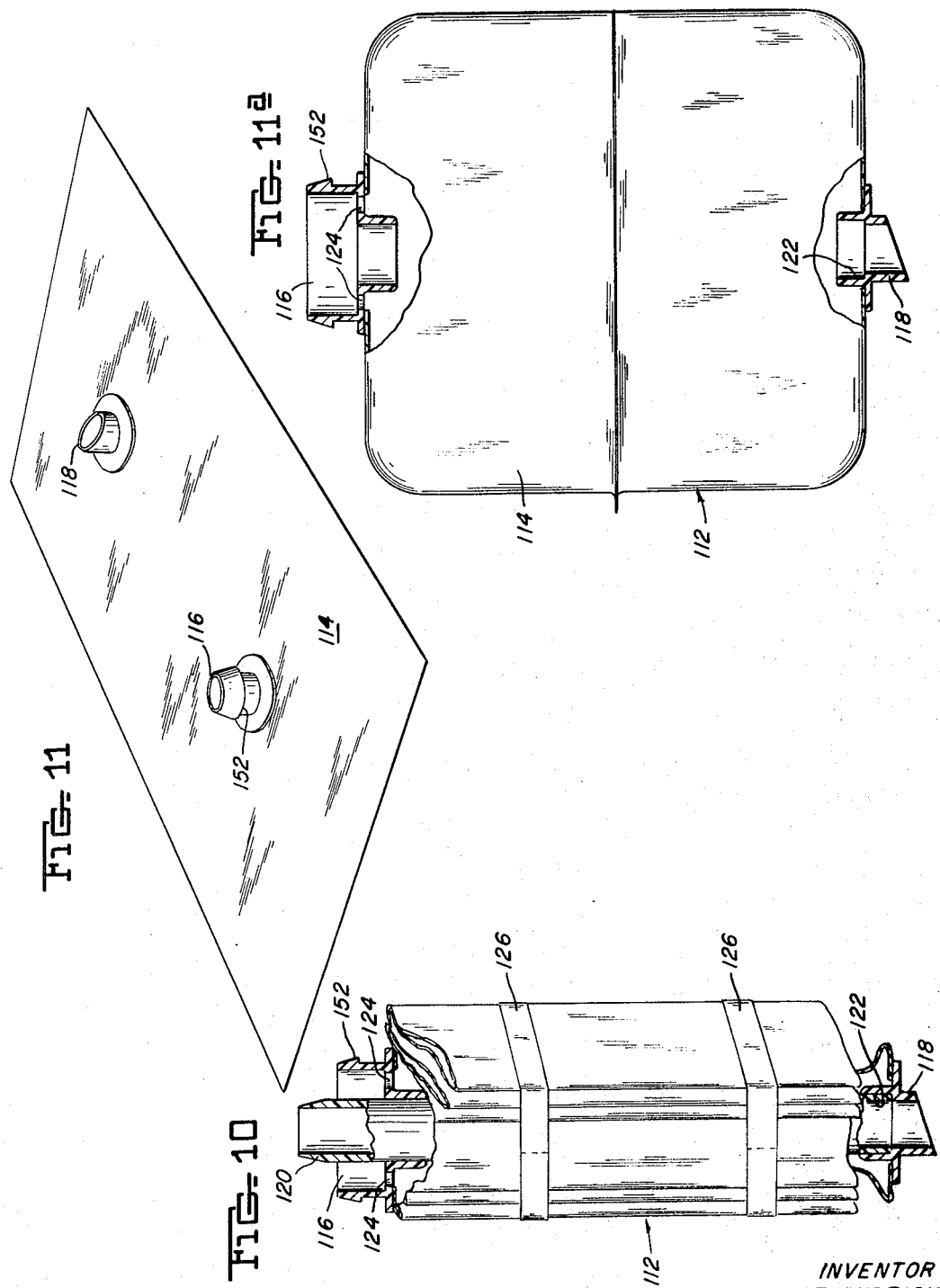

United States Patent Office 3,300,102
Patented Jan. 24, 1967

3,300,102
INFLATABLE BAG FLUID DISPENSING DEVICE
Tadeusz Budzich, Moreland Hills, Ohio,
(80 Murwood Drive, Chagrin Falls, Ohio 44022)
Filed Mar. 12, 1965, Ser. No. 439,276
8 Claims. (Cl. 222—386.5)

This invention relates generally to liquid dispensing devices, and more particularly to liquid dispensing devices, wherein the liquid to be dispensed is displaced by a contained displacing fluid. This invention has particular significance in dispensing of draft beer or other beverages.

The conventional prior art draft beer dispensers utilize air, or carbon dioxide pressure acting on the free surface of the beer in the container to induce flow of the beer through a dispensing nozzle. With such devices, the beer absorbs the gas used for pressure. If air is used, the oxygen in the air will tend to spoil the beer quickly, and other gasses such as carbon dioxide tend to produce excessive foaming.

It is therefore a principal object of this invention to provide a liquid dispensing device wherein dispensing fluid is provided, but separated from the liquid to be dispensed to prevent intermixing thereof.

Still another object of this invention is the provision of a liquid dispensing device in which an inflatable bag separates the liquid being dispensed from the dispensing fluid.

Yet another object of this invention is the provision of a liquid dispensing device which is facilely attachable and detachable from a container containing the liquid to be dispensed.

A further object of this invention is the provision of a liquid dispensing apparatus utilizing an inflatable bag for separating the dispensing fluid and the liquid to be dispensed.

Still an additional object of this invention is the provision of a beer dispensing mechanism utilizing an inflatable bag to prevent mixing of dispensing gas with the beer.

Yet a further object of this invention is to provide an inflatable bag member for use in a liquid dispensing mechanism, which will separate the liquid being dispensed from the dispensing fluid, and a method of manufacturing such a bag.

Other objects and advantages of the present invention will become apparent from the following description, reference being had to the accompanying drawings, in which:

FIGURE 1 is a vertical sectional view of a container with one embodiment of the dispensing apparatus of this invention mounted thereon for use;

FIGURE 1a is a fragmentary view in section showing the construction and operation of the gas exhaust feature of the device of FIGURE 1 when the device is removed from the container;

FIGURE 2 is a vertical sectional view similar to FIGURE 1 showing another embodiment of the inflatable bag utilized for containing the dispensing fluid and showing in chain lines various positions at various stages of inflation of the bag;

FIGURE 3 is a horizontal sectional view taken substantially along the plane of line III—III of FIGURE 2 showing the configuration of the bag when it is partially inflated;

FIGURE 4 is a vertical sectional view similar to FIGURE 3 showing another embodiment of the inflatable bag;

FIGURE 5 is a horizontal sectional view taken substantially along the plane of line V—V of FIGURE 4, with the bag inflated;

FIGURE 6 is a perspective view of the inflatable bag shown in FIGURES 2 and 3;

FIGURE 6a is a perspective view of a ring type bag shown in FIGURES 4 and 5 and shows diagrammatically how the same is manufactured;

FIGURE 7 is an enlarged perspective view of the inflating tube and associated structure of the bags of FIGURES 6 and 6a;

FIGURE 8 is another embodiment of an inflatable bag;

FIGURE 9 is a vertical sectional view of another embodiment of this invention utilizing another type of inflatable bag;

FIGURE 10 is a perspective view of the bag of FIGURE 9 and mounting thereof;

FIGURE 11 is a perspective view of the initial stage of the manufacturing of the bag of FIGURE 10; and, FIGURE 11a is a view of the final stage of manufacture of the bag of FIGURE 10.

Referring now to the drawings, several embodiments of the fluid dispensing device of this invention are shown and described. The description of this invention will be in conjunction with its use as a dispensing mechanism for "draft" beer contained in disposable metal containers, although the uses are not so limited.

Referring now to FIGURE 1, one embodiment of the beer dispensing mechanism of this invention is shown and designated generally as 10. The mechanism is detachably securable to a metal container 12 such as a "tin" can in which is contained the beer to be dispensed. The container 12 includes a central opening 14 in one end 16 thereof which may be provided by having a detachable member in the end of the container.

The container 12 is preferably formed with a lip, or an overhang 18 at the junction of the end 16 of the container with the cylindrical body 12 thereof.

The dispensing mechanism 10 includes a central body 22 on which is mounted in slot 24 a spring strap 26 which strap locks over the lip 18 of the container 12 and secures the dispensing mechanism 10 thereto. Surrounding the body 22 is a resilient elastomer seal 28 which seals the body 22 tightly in the opening 14 to make the opening of the container fluid tight to the ambient atmosphere. The body 22 has a central liquid conducting passage 30, counterbored at 32 for the reception of a liquid dispensing tube 34. The liquid conducting passage 30 communicates with a beer discharge spout 36 through a shut-off valve 38. The shut off valve 38 is manually operated by a handle 40 between "on" and "off" positions.

The elastomer seal 28 seals the lip end 42 of an elastic fluid tight inflatable bag member 44 adjacent the body 22. The other end of the bag member 44 includes an opening 46 through which the lower end of the tube 34 extends, and the walls around the opening 46 are sealed to ferrule 45 at the lower end of the tube 34.

A fluid conducting passage 50 is drilled in the body 22 which communicates at one end with the interior of the bag. The passage 50 has a counterbored portion 54 for reception of an adapter tube 56. There is also a passage 58 intersecting passage 50. The passage 58 is sealed by elastomer seal 28 and the lip end 42 of the bag member. The purpose of passage 58 will be described presently.

The adapter tube 56 is connected by a length of flexible tubing 60 to a hand air pump 62. The pump is of conventional design, and includes a pump housing 64 defining an internal chamber 66. A plunger 68 is disposed in the chamber 66 and is biased away from discharge passage 70 by spring 72. An eccentric ball type discharge check valve 74 is located in the discharge passage 70 and an intake check valve 76 closes intake passages 78.

A pumping action of the hand air pump 62 will force air under pressure into the inflatable bag 44, and when the valve 38 is opened the bag 44 will expand, as shown in solid lines in FIGURE 1 displacing the beer up the bore 80 of the tube 34 into the passage 30 and out the discharge spout 36. If the air is pumped when tthe valve 38 is closed, it will compress the air until the inherent capability of the air pump 62 is reached; and, when the valve is opened with the bag 44 containing the compressed air, the air will expand forcing the beer out through the discharge spout 36 as previously described. It is preferred, however, that the pumping action take place when the valve 38 is opened to avoid excessive foaming of the beer.

With the device utilized as described, the air is separated from the beer preventing contamination of the beer by the air.

When all of the beer has been dispensed, and the bag is inflated to fill the interior of the container, the device is removed by lifting up on the handle end 82 of spring strap 26. In addition to releasing the spring strap 26, this will pull the body 22 away from the elastomer seal 28 and lip 42 of the bag, as shown in FIGURE 1a, which will allow intersecting passage 58 to exhaust the air from the bag through passage 50 to the atmosphere thus deflating the bag. Continued upward pressure on the handle 82 will withdraw the elastomer seal 28 from the opening 14 and the dispensing mechanism 10 can be lifted from the container with the tube 34 and bag 44 being withdrawn from the container. The bag 44 and exposed portion of the tube 34, valve 38, and spout 36 can be washed, and they are thus ready for use again.

Referring now to FIGURE 2, a slightly modified dispensing device is shown. In this embodiment, the passage 50 is counterbored at 84 and a connection tube 86 is inserted therein. A somewhat different piston type air pump 62a is shown, which also is of a conventional design and illustrates that various types of air pumps may be utilized with any of the embodiments of this invention. The embodiment of FIGURE 2 is adapted for use with an inflatable non-elastic bag 88. The bag 88 is shown in FIGURE 6 in its opened and deflated condition. The bag has a skin 90 of a substantially non-elastic material such as polyethylene or vinyl plastic. A sheet of such plastic is folded over once and the edges heat sealed to provide the skin of the bag. Before folding, a plastic inflating tube 92, as shown in FIGURE 7, is inserted through the sheet of plastic and sealed thereto utilizing a reinforcing ring 94 of the same material. When the sheet is folded and sealed to form a bag the inflation tube provides a fluid passage to the interior of the bag. A plastic tab 96 is provided at the end of the bag at the opposite end of the inflating tube 92. The tab 96 has an opening 98 which slips over the lower end of the liquid conducting tube 34, as shown in FIGURE 2, and, as shown in FIGURE 2, the tube 34 has an enlarged portion 100 which prevents the tab from "riding up" the tube. When the bag is formed, it is accordion pleated to the form shown in FIGURE 2 and secured in this pleated condition by scored straps 102. The straps are scored to tear when subjected to force caused by air pressure from within the bag. To insert the device of FIGURE 2 into a container, first the inflation tube 92 is connected to the connector tube 86, and the opening 98 of the tab 96 is slipped over the end of the liquid conducting tube 34. The tube 34, with the bag 88 secured thereto by the tab 96, is inserted through the opening 14 in the container. The spring strap 26 snaps over the lip and forces the elastomer seal 28 tightly around the opening 14, as in the embodiment of FIGURE 1, and the device is ready to dispense beer. When the pump 62a is operated the bag 88 will start to inflate tearing straps 102, and inflation of the bag, as shown in FIGURE 3, will force the beer up the tube 34 and through passage 30 and discharge spout 36. And, as in the embodiment of FIGURE 1, when the container is emptied of beer, the strap is lifted and air is exhausted through passage 58. It should be noted, however, that in this embodiment a disposable bag which can be rather easily punctured is utilized, and hence the passage 58 can be omitted, since tearing of the bag 88 when it is removed is of no consequence, or the bag being disposable can be left in the container which is also disposable.

Referring now to FIGURE 4, the same type dispensing apparatus as that of FIGURE 2 is shown utilizing a slightly modified disposable, inflatable, substantially non-elastic bag 88a. The bag of this embodiment is manufactured in the same manner as the bag of FIGURE 6, but, as shown in FIGURE 6a the bag 88a is then formed into a ring shape by heat sealing the opposite ends thereof. The bag is pleated in a similar manner as the bag of FIGURE 2 and held with scored straps and secured to the tube 34 with a tab. The tube 34 extends down through the center of the ring, as shown in section in FIGURE 3. This ring shaped bag if expanded in an unrestricted, unencumbered space would form a substantially toroidal shape, pinched at a lapping joint. However, when constrained by the cylindrical wall of the container, the ring shaped bag will inflate with the surface that surrounds the tube forming folds in a regular star shaped pattern, as shown in FIGURE 5.

Referring now to FIGURE 8 another modification of the non-elastic, inflatable disposable bag is shown and designated by reference character 88b. In this embodiment, the end of the folded and sealed bag is heat sealed to an intermediate area 105b of the bag skin 90b, so that there is a ring section 106b, and an extention section 108b. In this embodiment, the tube 34 extends through the center of the ring section 106b. The ring section 106b will expand as described with respect to the bag 88a of FIGURE 6a, and the extension section will provide a volume reserve capacity for any irregularity in unfolding that might occur.

It should be noted that all of the embodiments of the inflatable, non-elastic bag should have a surface area substantially greater than the surface area of the interior of the container in order to effectively remove all of the liquid from within it.

Referring now to FIGURE 9, yet another embodiment of a beer dispensing mechanism is shown and designated by the reference character 110. This embodiment is adapted for use with the modification of the bag means 112 shown in FIGURES 10, 11, and 11a. Referring now to FIGURES 11 and 11a the manufacturing steps for producing such a bag 112 are shown. First, a flat sheet of plastic 114 is provided, rectangular in shape. A pair of ferrules 116 and 118 are inserted through the sheet and heat sealed therein as shown in FIGURE 11. The sheet of plastic 114 is then folded under and doubled back on itself as shown in FIGURE 11a, and the three mating edges are heat sealed, as shown in FIGURE 11a to form a fluid tight bag.

Referring now to FIGURES 9 and 10, a plastic tube 120 is inserted through ferrule 116 and extends into counterbore 122 of ferrule 118; with the tube 120 thus inserted, the interior of the bag 112 is sealed from the interior of the container 12 by the ferrules 116 and 118. The ferrule 116 is provided with air passages 124 which communicate with the interior of the bag 112. The bag 112 is accordion folded as shown in FIGURE 10 and provided with scored plastic straps 126 which will function in a similar manner to the straps shown in the other embodiments.

Referring again to FIGURE 9, the dispensing mechanism 110 includes a body 128 having a spring strap 130 residing in slot 132 provided in said body. The strap locks over the lip 18 of the container 12 to secure the dispensing mechanism thereon. Secured to the bottom of the body 128 is an annular elastomer seal 134 which seals the body 128 in the opening 14 of the container to make the opening fluid tight. The body 128 is provided with a central liquid conducting passage 136 which is counterbored at 138 and undercut at 140 to receive an elastomer tube seal 142. The passage 136 communicates with a beer discharge spout 144 through a shut-off valve and handle assembly 146.

The body 128 is provided with a fluid conducting passage 148 which communicates with air pump 150. In this embodiment of the invention, shown in FIGURES 9 and 10, the bag 112 and plastic tube 120 constitute a disposable unit to be used in combination with the dispensing device. The bag 112 is mounted on the tube 120 as shown in FIGURE 10, and the tube 120 is then inserted into the elastomer tube seal 142. Barb 152 on ferrule 116 will be secured to the elastomer seal 134 when the spring strap 130 is snapped into place on the lip 18 of the container 12. The air pump 150 delivers air to the interior of the bag 112 through fluid conducting passages 148, and air passages 124 in ferrule 116. When the beer has been dispensed, the device is removed and the tube 120 and bag 112 discarded as a unit.

While several embodiments of this invention have been shown and described, various adaptations and modifications thereof may be made without departing from the scope of the appended claims.

What is claimed is:

1. A liquid dispensing device adapted to pump liquid from a container by pumping fluid into inflatable bag means immersed in the liquid in the container comprising, means for detachably mounting said dispensing device on the container, liquid conducting means disposed to communicate with a liquid within the container when the dispensing device is mounted on the container, means to mount the inflatable bag means for immersion within the liquid in the container, means maintaining the bag means in a prefolded condition during insertion into the liquid, said bag means being formed of a substantially non-elastic material, and fluid pressurizing means disposed to communicate with said inflatable bag means when the bag means is immersed in the liquid, whereby fluid supplied to the bag means from said pressurizing means will cause the bag to expand and displace the liquid from the container to the liquid conducting means.

2. The combination of claim 1 wherein said bag means includes frangible means to maintain it in the folded condition and breakable upon pressure generated within said bag means.

3. The combination of claim 1 further characterized by said liquid conducting means including a tube arranged to project into the container through its opening, and said bag means including tab means to detachably secure it to said tube.

4. The combination of claim 1 wherein said bag means is inflatable to a substantially toroidal shape.

5. The combination of claim 4 wherein said liquid conducting means includes a tube arranged to project into the container through its opening adjacent to and outside the bag means, and said bag means is arranged to surround said tube.

6. The combination of claim 5 further characterized by means to detachably secure the bag means to the tube.

7. The combination of claim 1 wherein said liquid conducting means includes tube means detachably connectable to said device disposed to extend into said container, and said bag means including means to mount it on said tube means.

8. The combination of claim 7 wherein said tube means and bag means are disposed with the tube means extending adjacent to and outside the bag means.

References Cited by the Examiner

UNITED STATES PATENTS

| | | | |
|---|---|---|---|
| 1,977,862 | 10/1934 | Schottes | 222—386.5 |
| 2,063,430 | 12/1936 | Graser | 222—386.5 |
| 2,991,916 | 7/1961 | Kish | 222—386.5 |
| 3,198,405 | 8/1965 | Pfeil | 222—400.8 |

FOREIGN PATENTS 10,746  10/1912  Great Britain.

ROBERT B. REEVES, *Primary Examiner.*

STANLEY H. TOLLBERG, *Examiner.*